(12) United States Patent
Takahashi

(10) Patent No.: US 8,686,267 B2
(45) Date of Patent: Apr. 1, 2014

(54) BRASS INSTRUMENT PRACTICE DEVICE

(76) Inventor: Toshiyuki Takahashi, Tokyo (JP)

( * ) Notice: Subject to any disclaimer, the term of this patent is extended or adjusted under 35 U.S.C. 154(b) by 206 days.

(21) Appl. No.: 13/377,570

(22) PCT Filed: May 10, 2010

(86) PCT No.: PCT/JP2010/057908
§ 371 (c)(1),
(2), (4) Date: Dec. 12, 2011

(87) PCT Pub. No.: WO2010/146946
PCT Pub. Date: Dec. 23, 2010

(65) Prior Publication Data
US 2012/0085220 A1 Apr. 12, 2012

(30) Foreign Application Priority Data
Jun. 19, 2009 (JP) .................. 2009-146837

(51) Int. Cl.
*G09B 15/06* (2006.01)
(52) U.S. Cl.
USPC .......................................................... 84/465
(58) Field of Classification Search
USPC ................ 84/464, 470 R, 453, 465
See application file for complete search history.

(56) References Cited

U.S. PATENT DOCUMENTS

2005/0192157 A1 9/2005 Norton
2008/0087159 A1* 4/2008 Heintz ........................ 84/470 R

FOREIGN PATENT DOCUMENTS

| FR | 1111489 | 2/1956 |
|----|---------|--------|
| JP | 2000250532 | 9/2000 |
| JP | 3097484 | 1/2004 |
| JP | 2006345945 | 12/2006 |
| JP | 2007117688 | 5/2007 |
| JP | 2008152015 | 7/2008 |

OTHER PUBLICATIONS

The friends of Music Magazine, distributed, Mar. 20, 1993, cover p. 71.

* cited by examiner

*Primary Examiner* — Kimberly Lockett
(74) *Attorney, Agent, or Firm* — Mark M. Friedman

(57) ABSTRACT

A brass instrument practice device (1) is used for practicing while holding a lip state for playing a brass instrument and has a tubular body (10) and a mouth piece portion (20). The tubular body (10) has a through hole (11) formed inside. The mouth piece portion (20) is secured on one end side of the tubular body (10), has a cross-sectional shape relatively long in one direction so as to fit the shape between the upper and lower lips, and has an opening portion (22) communicating with the through hole (11) and constituting a flow path through which air from the lips flows.

8 Claims, 3 Drawing Sheets

BRASS INSTRUMENT PRACTICE DEVICE

TECHNICAL FIELD

This invention relates to a brass instrument practice device, and in particularly, to a practice device for training the muscles around the lips so as to grasp a correct playing posture for sounding.

BACKGROUND

With respect to a brass instrument, such as trumpet, trombone, french horn and the like, the instrument itself does not have a sounding part, and the lips of an executant will constitute a sound source. When playing the brass instrument, the executant vibrates his lips by feeding an air from a lung in the state that the lips are aligned with a mouthpiece, moreover, in order to make a correct sound, it is necessary to keep a proper gap between the upper and lower lips formed by the fed air, and form a embouchure which makes the muscles around the lips tightened while keeps the lips soft.

However, in order to make the correct sound, it is very important to train the muscles around the lips through correct postures. The training for embouchure does not only refer to strengthening the muscles, but also refer to training an exquisite relaxation sense while keeping a desired posture. However, in fact, in order to learn the proper embouchure so as to perform the sounding of the brass instrument, quite a number of trainings are necessary in the past.

As a method for training the muscles around the lips, as recorded in page 71 of "新版吹奏楽講座 第2巻 金管楽器 (edited by 浅香淳, the Friends Of Music Magazine, distributed on Mar. 20, 1993)", a method of holding the chopsticks in the mouth so as not to be fallen is used to train the muscles around the lips. However, in the case of holding the chopsticks in the mouth, there is a possibility that a shape of the mouth may be corrected into a undesired shape for sounding due to a difference between the shapes of the chopsticks and the mouth. When squeezing out the air from the lips in the case of holding the chopsticks in the mouth, the air flows in a gap between the chopsticks and the lips, therefore, the flowing of the air is different from that when actually playing the instrument. Therefore, it is unable to learn the exquisite relaxation sense while keeping the desired posture by means of such training using the chopsticks, thus a quite number of trainings are required to allow the brass instrument make sound.

SUMMARY OF THE INVENTION

The invention is made to solve above-mentioned problems existed in the related art, and an object of this invention is to provide a brass instrument practice device which can keep a proper shape of the lips and can realize a similar air-exhausting status as that when actually playing the instrument, so as to train the muscles around the lips.

The brass instrument practice device for realizing above object according to the invention is such a brass instrument practice device used to make trainings while keeping a lip state of the brass instrument. The brass instrument practice device comprises: a tubular body having a through hole formed inside; and a mouth piece portion secured on one end side of the tubular body. The mouth piece portion has a cross-sectional shape with one direction relatively long so as to fit to the shape between the upper and lower lips, and has an opening portion communicating with the through hole and constituting a flow path through which the air from the lips flows.

In the brass instrument practice device according to the invention with above-mentioned structures, because the mouth piece portion has such a cross-sectional shape with one direction relatively long so as to fit to the shape between the upper and lower lips, it is possible to train the muscles around the lips while keeping the shape of the lips correct by holding the mouth piece portion in the lips. In addition, because the mouth piece portion has the opening portion which is communicating with the through hole of the tubular body, it is possible to exhaust air by the central portion between the upper and lower lips. Therefore, it is possible to keep the proper posture of the lips and simultaneously endure an air resistance and a weight produced by the through hole at the time of exhausting air with the muscles of the lips, and at the same time train the muscles in a manner of performing a shape memorizing practice for the muscles required for making embouchure.

BRIEF DESCRIPTION OF THE DRAWINGS

FIG. 1 is a brass instrument practice device according to a embodiment of the invention, wherein FIG. 1(A) is a top view, and FIG. 1(B) is a sectional view along line B-B of FIG. 1(A).

DETAILED DESCRIPTION OF THE EMBODIMENTS

Figure 1:
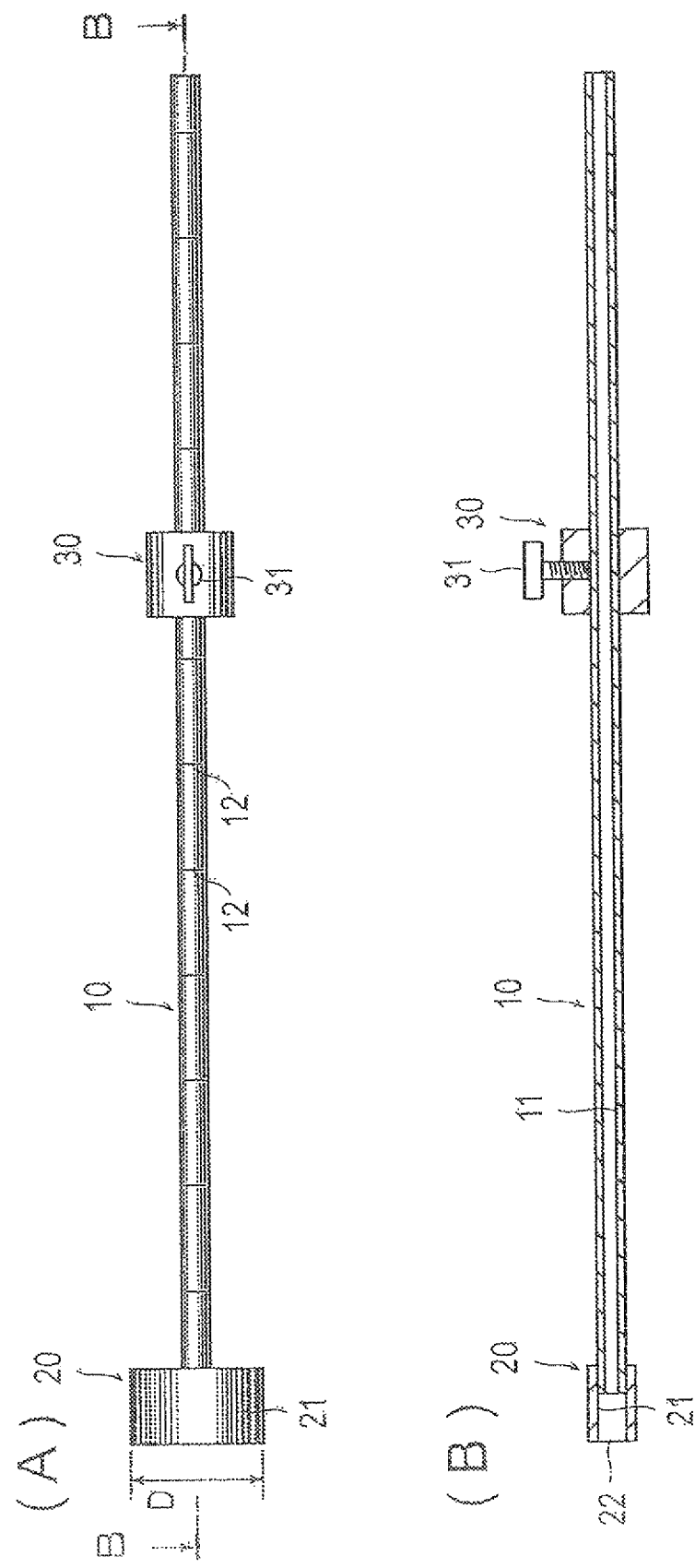

Hereinafter, an embodiment of the invention will be described referring to the drawings.

A brass instrument practice device 1 according to the embodiment is such a device used to train the muscles around the lips for a player of the brass instrument.

Figure 2:
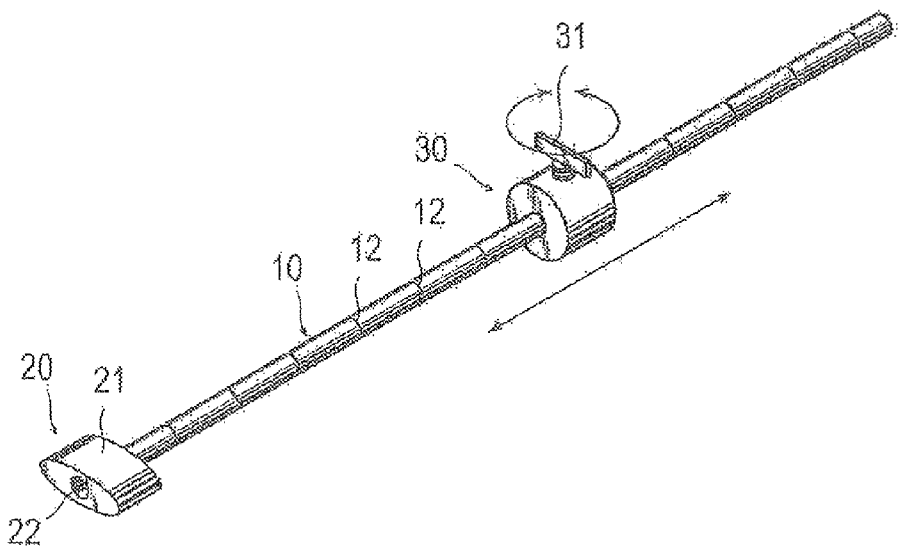
FIG. 2 is a perspective view showing the brass instrument practice device.

As shown in FIGS. 1 and 2, the brass instrument practice device 1 comprises: a tubular body 10 having a through hole 11 formed inside; and a mouth piece portion 20 fixed on one end side of the tubular body 10.

The mouth piece 20 has a cross-sectional shape with one direction having a relatively long width D so as to be matched with an elongated space formed between the upper and lower lips when playing the brass instrument. The cross-sectional shape of the mouth piece portion 20 is formed so that the surface in circumferential direction as a whole forms a straight plane toward a direction perpendicular to the cross section (an axial direction of the tubular body 10). In particularly, an outer periphery surface 21 is preferred to be smoothly curved toward the circumferential direction. In this embodiment, the cross section is formed to have an oval like shape. As a result, the lips are allowed to follow the mouth piece portion 20 spontaneously.

In addition, the mouth piece portion 20 is formed with a fixing hole 21 to which a outer diameter of the tubular body 10 is fitted and fixed, and at one side of the fixing hole 21 that is opposite to that the side for fixing to the tubular body 10, a opening portion 22 communicating with the through hole 11 of the tubular 10 is formed. Furthermore, although the tubular body 10 is inserted through a central portion of the fixing hole 21 in the embodiment, it is not limited thereto, and for example, the tubular body 10 may be inserted through the opening portion 22, and also may be fixed to an end portion of the fixing hole 21 by a adhesive or by welding other than being inserted through the fixing hole 21. In addition, instead of being made separately and then fixed to each other, the mouth piece portion 20 and the tubular body 10 can also be made integrally by the same component.

A plurality scales 12, which are arranged along a extending direction of the tubular body 10 with a certain interval, are formed on the outer surface of the tubular body 10. The scales 12 are formed, for example, in a manner of grooves or by coating the paints, but not limited thereto. In addition, the intervals between the scales 12 are not particularly limited as well.

An overlapped portion 30 is detachably connected on the outer surface of the tubular 10. The overlapped portion 30 has a ring shape and is fixed to the outer surface of the tubular body 10 by a fixing screw 31 which is screwed with a threaded hole passing through from the outer surface to the inner surface, as shown in FIG. 2. Therefore, by loosing the fixing screw 31 so as to move along the outer surface and be fastened at a random position, the fixing screw 31 can be fixed. It should be noted that the form of the overlapped portion 30 is not limited thereto, for example, this overlapped portion 30 may be hold in a manner of elasticity, and also may be formed in a manner of clip which can move easily. In addition, the overlapped portion can also be fixed and formed at a prescribed position on the tubular body 10.

The materials of the mouth piece portion 20, the tubular portion 10 and the overlapped portion 30 have no particular limitation, for example, any material could be used as long as a metal material, such as stainless steel, aluminium and the like, a resin material and a lignum can keep their shapes. In addition, in view of ensuring certain strength so as to prevent from broken, the metal material is preferred. Moreover, in view of productivity, the resin material is preferred.

The designs of the outline shape of the mouth piece portion 20, the inner diameter of the opening portion 22, the inner diameter or length of the tubular body 10 and the weight of the overlapped portion 30 could be changed properly depending on the kind of the instrument, the level of the player and the shape of his lips. It is preferred that a plurality kinds of brass instrument practice devices 1 are provided depending on the kind of the instrument, the level of the player and the shape of his lips. As an example, the longer diameter of the cross section of the mouth piece portion 30 is preferred in a range of 5 mm to 30 mm, the shorter diameter thereof is preferred in a range of 3 mm to 8 mm and the axial length is preferred in a range of 5 mm to 20 mm, but not limited thereto.

A description to the function of the brass instrument practice device 1 according to the embodiment will be made below.

Figure 3:
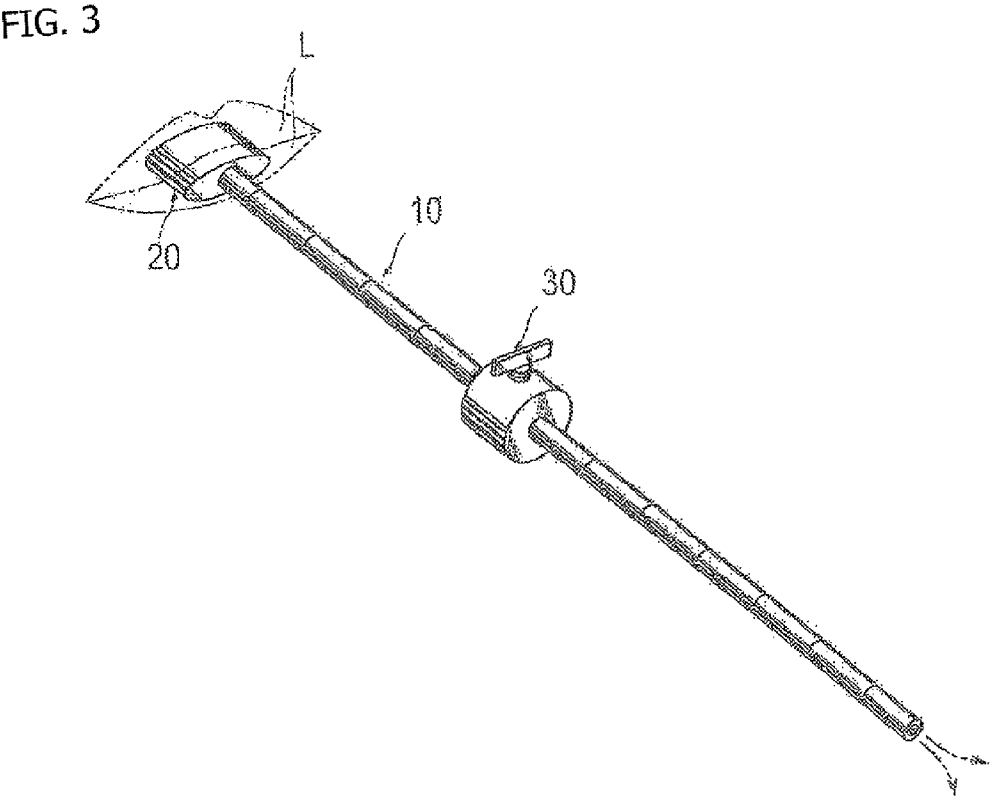
FIG. 3 is a perspective view showing the brass instrument practice device during use.

When using the brass instrument practice device 1, the overlapped portion 30 is fixed at a preferred position on the outer surface of the tubular body 10, firstly. At this time, because the outer surface of the tubular body 10 has the scales 12, the overlapped portion 30 could be precisely located with respect to the outer surface. The overlapped portion 30 can be inserted through the tubular body 10 from a front end side (opposite to the side to which the mouth piece portion 20 is connected) of the tubular body 10. As shown in FIG. 3, as the overlapped portion 30 is fixed closer to the front end side of the tubular body 10, the position of the overlapped portion 30 is further away from the lips L in a state that the mouth piece portion 20 is hold by the lips L, and thus the moment acting on the lips L become larger. Therefore, as the overlapped portion 30 is fixed closer to the front end side, a load acting on the lips L is further enhanced, thus the trainings to the muscles around the lips L could be further intensified.

As mentioned above, the brass instrument practice device 1 according to this embodiment can select a training with a desired intensity randomly by changing the position of the overlapped portion 30.

Figure 4:
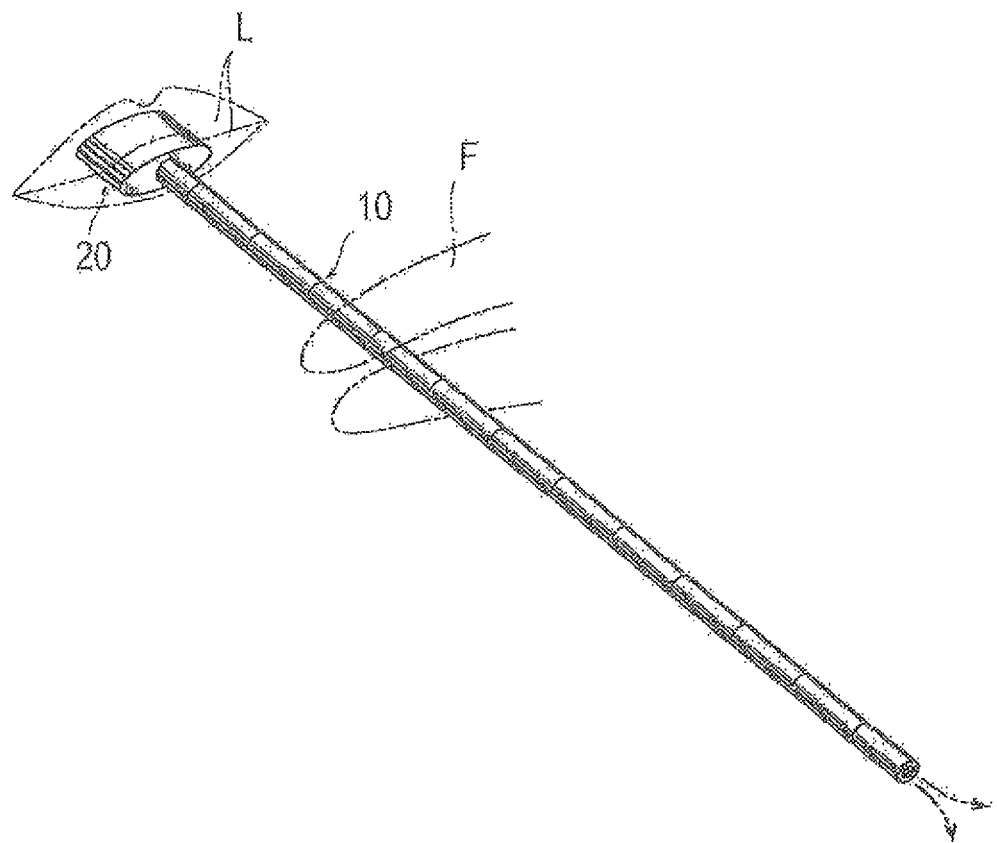
FIG. 4 is a perspective view showing the brass instrument practice device during use in case of having no overlapping portion.

Moreover, as shown in FIG. 4, the brass instrument practice device 1 can be used in the state that the overlapped portion 30 is removed from the tubular body 10. In addition, it is also permitted to fix a plurality of overlapped portions 30 or to select a proper overlapped portion 30 from a plurality of overlapped portions with different weights.

As shown in FIG. 3, after fixing the overlapped portion 30 at the desired position, the mouth piece portion 20 is held between the upper and lower lips L. At this time, because the mouth piece portion 20 has such a cross-sectional shape that one direction has a relatively long width D, the space between the upper and lower lips L is held to be a elongated space which is suitable to make the brass instrument sound in the state that the mouth piece portion 20 is held by the player. From then on, only lips L can be used to realize the holding in a manner that the brass instrument practice device 1 is not allowed to be fallen. At this time, like playing the brass instrument, the key point is to have the muscles around the lips L tightened while keep the lips in a soft and relaxing state. Furthermore, as shown in FIG. 4, except for the lips L, fingers F may also be used to support.

In this state, the air is exhausted from the front end side of the through hole 11 of the tubular body 10 (referring to the double dot dash line in FIG. 3) by exhausting the air from the opening portion 22 of the mouth piece portion 20. Then, through exhausting the air from the opening portion 22, the air is exhausted via the central potion between the upper and lower lips L. At this time, the air is flowing little by little from the through hole 11, and the interior of the mouth is brought into such a state that a internal pressure has been acted. Therefore, the muscles around the lips L are trained by keeping a proper shape of the lips L with the mouth piece portion 20 and reproducing a similar air exhausting state as actually playing the instrument. That is, when the player actually plays the brass instrument, the air is fed from the lung in the state that the closed lips are aligned with the mouthpiece, then a gap is formed between the upper and lower lips and these lips vibrate by the fed air, thus it is possible to reproduce a similar state with this so as to train the muscles around the lips L.

Moreover, because the internal pressure of the mouth is acted on the mouth piece portion 20, the brass instrument practice device 1 is subjected to a force in a direction of being flown out from the mouth. In addition, because the inner wall of the through hole 11 is subject to a resistance due to the exhausted air, the brass instrument practice device 1 is further subjected to a force in the direction of being flown out from the mouth. Therefore, it is possible to endure the air resistance produced in the mouth piece portion 20 and the through hole 11, which attempt to be flown out due to the interior pressure of the mouth when exhausting the air, and endure the weight of brass instrument practice device 1, with the muscles of the lips L, and at the same time, possible to train the muscles in a manner of performing a shape memorizing practice for the muscles required for making embouchure. In addition, even in the state that no interior pressure of the mouth is acted, a supporting method of the muscular force around the lower lip could also be learned just like in a pressure state by the weight of the brass instrument practice device itself, particularly.

Moreover, the surface in the circumferential direction, as a whole, of the mouth piece portion 20 contacted with the lips L is designed to have a straight shape toward a direction perpendicular to the cross section (the axial direction of the tubular body 10), therefore, the surface over 360 degrees, as a whole, of the mouth piece portion 20 contacted with the lips L is formed into a smooth shape without concave and convex toward the direction perpendicular to the cross section. With this structure, the surface of the mouth piece portion 20 can not be stuck on the lips L when the mouth piece portion 20 is held by the lips L, and thus the device will not be fallen only by holding this device with the force of the lips L. Then, the muscles around the lips could be trained effectively by holding with the lips.

Furthermore, because the user can adjust the degree of exhausting so as to change the interior pressure of the mouth to perform some practice, it is possible to experience a infinite adjustment for the musical force used to hold the mouth piece portion 20, and cultivate the soft performance for performing a jump of a tone (the variation of the tone) when playing the brass instrument. Especially, as for the brass instrument, there is a situation that the jump of the tone is realized only by the shape (embouchure) of the lips, thus the brass instrument practice device 1 according to the embodiment is effective in practicing the jump of the tone.

In addition, through such training, not only the muscles around the lips can be trained, but also a training for abdominal respiration and vital capacity can be performed simultaneously.

Furthermore, in a situation that the state of the lips L are held after the air is exhausted from the through hole 11 or during exhausting, as shown in FIG. 4, the brass instrument practice device 1 can be drawn out of the lips L by holding the tubular body 10 with hands, and the brass instrument can be played while holding the state of the lips L after drawing. Also, if the brass instrument practice device 1 is drawn out of the lips during exhausting air, the lips vibrates due to the its action, and thus it is very effective in practicing the sounding of the brass instrument required for the vibration of the lips.

Thus, the muscles around the lips L can be trained so as to adapt to playing the brass instrument, by performing above trainings repeatedly during a certain time.

Therefore, the brass instrument practice device 1 allows anyone to grasp the actions required for the sounding of the brass instrument and to grasp the postures for sounding easily. As a result, anyone can play the brass instrument easily, which is always difficult presently, when using the brass instrument practice device according to this invention.

Figure 5:
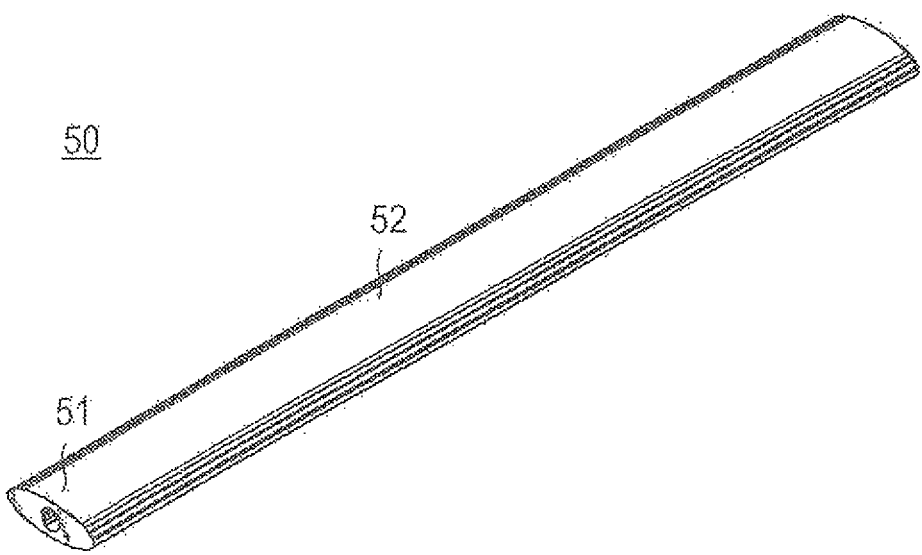
FIG. 5 a perspective view showing another example of the brass instrument practice device.

In addition, this invention is not limited to above embodiment, and kinds of variations could be made as long as within the scope of the Claims. For example, FIG. 5 shows another kind of brass instrument practice device 50, wherein the shape of the cross section of the mouth piece portion 51 is the same with that of the tubular body 52. In case of this kind, the production becomes easy and the productivity is improved. Furthermore, the scales and overlapped portion can also be provided on this kind of brass instrument practice device 50, of course.

In addition, the materials used for the brass instrument practice device 1 shown in FIGS. 1-4 are less than that shown in FIG. 5, thus an effect of reducing the material costs could be expected. Furthermore, the brass instrument practice device 1, 50 according to this invention has no limitation to the kind of the brass instrument.

The invention claimed is:

1. A brass instrument practice device, used for practicing while holding a lip state for playing a brass instrument, characterized in comprising:
   a tubular body (10) which has a through hole (11) formed inside;
   a mouth piece portion (20) which is fixed on one end side of the tubular body (10) and has a cross-sectional shape relatively long in one direction so as to match a shape between upper and lower lips of a user, wherein the mouth piece portion (20) has an opening portion (22) communicating with the through hole (11) so as to constitute a flow path through which air from the lips flows; and
   an overlapped portion (30) mounted on the tubular body (10).

2. The brass instrument practice device according to claim 1, characterized in that, a surface of the mouth piece portion (20) in circumference direction as a whole, which contacts with the lips, is formed into a line toward a direction perpendicular to said cross sectional shape.

3. The brass instrument practice device according to claim 1, characterized in that, the overlapped portion (30) is mounted at a random position along an extending direction of the tubular body (10).

4. The brass instrument practice device according to claim 2, characterized in that, the overlapped portion (30) is mounted at a random position along an extending direction of the tubular body (10).

5. The brass instrument practice device according to claim 1, characterized in that, on an outer surface of the tubular body (10), markings (12) showing the position in the extending direction of the tubular body (10) are formed.

6. The brass instrument practice device according to claim 2, characterized in that, on an outer surface of the tubular body (10), markings (12) showing the position in the extending direction of the tubular body (10) are formed.

7. The brass instrument practice device according to claim 3, characterized in that, on an outer surface of the tubular body (10), markings (12) showing the position in the extending direction of the tubular body (10) are formed.

8. The brass instrument practice device according to claim 4, characterized in that, on an outer surface of the tubular body (10), markings (12) showing the position in the extending direction of the tubular body (10) are formed.

* * * * *